United States Patent
Soga et al.

(10) Patent No.: US 6,955,429 B2
(45) Date of Patent: Oct. 18, 2005

(54) INK-JET RECORDING HEAD, INK CARTRIDGE, AND RECORDING APPARATUS

(75) Inventors: Mamoru Soga, Osaka (JP); Takatoshi Minoda, Kumamoto (JP); Hidekazu Arase, Hyogo (JP); Masaichiro Tatekawa, Osaka (JP)

(73) Assignee: Matsushtia Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/468,955
(22) PCT Filed: Sep. 18, 2002
(86) PCT No.: PCT/JP02/09591
§ 371 (c)(1), (2), (4) Date: Aug. 22, 2003
(87) PCT Pub. No.: WO03/026895
PCT Pub. Date: Apr. 3, 2003

(65) Prior Publication Data
US 2004/0085420 A1 May 6, 2004

(30) Foreign Application Priority Data
Sep. 19, 2001 (JP) ........................................ 2001-284919

(51) Int. Cl.$^7$ ................................................. B41J 2/01
(52) U.S. Cl. .......................................... 347/100; 347/86
(58) Field of Search ............................ 347/100, 95, 96, 347/101, 44, 45, 54, 48, 84, 85, 86; 106/31.6, 31.13, 31.27; 523/160

(56) References Cited

U.S. PATENT DOCUMENTS 6,054,505 A * 4/2000 Gundlach et al. ............ 523/160
6,211,265 B1 * 4/2001 Ohta et al. .................. 347/100

FOREIGN PATENT DOCUMENTS

| JP | 10-52924 A | 2/1998 | |
| JP | 10212439 A | 8/1998 | |
| JP | 10-052924 | * 2/1999 | ............ B41J/2/175 |
| JP | 11-293167 | * 10/1999 | ........... C09D/11/00 |
| JP | 11315231 A | 11/1999 | |
| JP | 2000178494 A | 6/2000 | |

OTHER PUBLICATIONS

International Search Report for International Application No. WO 03/026895 A1 completed Nov. 5, 2002; ISA/JPO.

* cited by examiner

Primary Examiner—Manish S. Shah
(74) Attorney, Agent, or Firm—Harness, Dickey & Pierce, P.L.C.

(57) ABSTRACT

Changes of ink properties are prevented in an ink jet recording head, an ink cartridge, and a recording apparatus which include ink containing a dye having an anion group, a humectant, a penetrant, water, and a hydrolyzable silane compound having an amino group. Resin or rubber which contains a hydrogen ion releasing additive is used for a member of the apparatus with which ink for ink jet recording comes in contact. The content of the additive in the material is not less than 0.001% by mass and not more than 0.1% by mass. The additive includes at least an acid, a ketone, and a functional group of ester each of which exhibits acidic properties.

21 Claims, 5 Drawing Sheets

INK-JET RECORDING HEAD, INK CARTRIDGE, AND RECORDING APPARATUS

TECHNICAL FIELD

The present invention relates to ink jet recording heads, ink cartridges and recording apparatuses, and more particularly relates to measures for preventing changes in ink properties.

BACKGROUND ART

Conventionally, ink cartridges including ink, ink jet heads for discharging ink onto a sheet of recording paper and recording apparatuses have been known. In a known recording apparatus, its members, such as an ink cartridge, a tube through which ink is introduced to an ink jet head, and an adhesive agent used in the ink jet head, with which ink comes in contact are formed of resin, rubber, or like materials, in general.

In order to improve reliability and workability, a thermal stabilizer, an auxiliary stabilizer, a plasticizer, an antioxidant, a light stabilizer, a lubricating additive, or the like are added to resin, rubber, or like materials. Thermal stabilizers include metal soap types, lead containing types, and organic tin containing types. For example, Ba/Zn containing metal soap, lead stearate, organic monomethyltin or the like is used as a thermal stabilizer. Auxiliary stabilizers includes phosphite types, epoxy compound types, and β-diketone types. For example, trialkylphosphite, epoxy soybean oil, acetylacetone or the like is used as an auxiliary stabilizer. Plasticizers include aliphatic dibasic acid ester types, chlorinated paraffin types, polyester types, and epoxy types. For example, dibutyl phthalate, 2-etylhexyl adipate, chlorinated paraffin (chlorinated rate: 50%), epoxy soybean oil or the like is used as a plasticizer. Antioxidants includes phenol types, sulfur types and phosphorus acid types. For example, 2,6-di-t-butyl-4-methylphenol, dilauryl-3,3'-thiodipropionate, and trisnonylphenylphosphine is used as an antioxidant. As for light stabilizers, a UV sorbent can be used as a light stabilizer, and there are also hindered amine type light stabilizers. UV sorbents includes benzotriazole types and benzophenone types. For example, 2-(2'hydroxy-5'-methylphenyl) benzotriazole, 2,4-dihydroxybenzophenone or the like is used. Hindered amine type light stabilizers include, e.g., bis-(2,2,6,6-tetramethyl-4-piperidinyl) sebacate. Lubricating additives include hydrocarbon types, fatty acid types, aliphatic alcohol types, aliphatic amide types, metal soap types and ester types. For example, alkylnaphthene hydrocarbon, stearic acid, stearyl alcohol, stearic acid amide, calcium stearate, butyl stearate or the like is used as a lubricating additive. Basically, it is difficult to maintain desired properties of resin, rubber or like materials unless such additives as the above-described ones are added thereto.

As for adhesive agents, which are acrylic resin, epoxy resin, silicon resin and the like, additives are also added for the purpose of attaining thermal stability, oxidation resistance, light stability, chemical resistance or the like, as in the same manner for the above-described resin, rubber or like materials.

Meanwhile, as ink for use in ink jet recording, ink containing a water-soluble dye as a colorant, a humectant, a penetrant and water is well known. It has been proposed that water-resistivity of an image formed on a recording medium is improved by making ink contain as a water-resistant agent a water-soluble substance such as a hydrolyzable silane compound which undergoes condensation polymerization even without water (Japanese Unexamined Patent Publication No. 11-293167, Japanese Unexamined Patent Publication No. 10-212439). In the ink, when an ink droplet is attached to the recording medium and then the water of the ink droplet evaporates or permeates into the recording medium, condensation polymerization of the water-soluble substance occurs. The condensation-polymerized water-soluble substance forms so-called "network" (a network structure) around molecules of a dye. Therefore, even though the image on the recording medium is wet with water, the dye molecules hardly go out of the network and thus hardly are eluted into the water. As a result, the water-resistivity of the image is improved.

However, in the conventional recording apparatus, ink comes in contact with members such as an ink cartridge formed of resin, rubber or like materials, and the ink then flows. This may cause elution of elements of the members into the ink due to temperature changes or changes thereof with passage of time. In such a case, there arises a problem in which eluted elements react with elements of the ink to form an impurity in the ink or to change properties of the ink.

In view of the above-described problems, the present invention has been devised and it is therefore an object of the present invention to specify the content of an additive added to a material for parts of an ink jet recording head, an ink cartridge, and a recording apparatus with which ink comes in contact and thereby to prevent properties of ink from changing.

DISCLOSURE OF INVENTION

The present inventors, as a result of our devoted study, found that if a material such as resin, rubber with which ink comes in contact includes more than a predetermined amount of an additive, an element of the material is eluted into the ink, generating hydrogen ions. By effects of the generated hydrogen ions, the ink will be gelled. More specifically, it is supposed that in ink, for example, the interaction between an amino group of a silane compound and an anion group of a dye which exhibits hydrophile properties suppresses ionization of the anion group, thus improving the water-resistance, as shown in FIG. 5. However, by an element eluted from a material such as resin or rubber in contact with ink, hydrogen ions may be generated, as shown in FIG. 6. The generated hydrogen ions are considered to be absorbed into the amino group of the silane compound. Then, if the hydrogen ion concentration is over a predetermined level, the interaction between the amino group of the silane compound and the anion group of the dye is strengthened and becomes cohesive. It seems that because of this, the binding of the silane compound and the dye is strengthened and condensed and thus the ink get becomes gelled.

Particularly, it is supposed that since the ink is alkaline, an element from which hydrogen ions are easily generated can be eluted from a material such as resin and rubber with which the ink is in contact.

In order to achieve the above-described object, according to the present invention, the content of an additive in a material for a member of ink jet head or the like with which ink comes in contact is specified to be in a predetermined range, thereby preventing the ink from being gelled.

Specifically, in the present invention, an ink jet recording head is assumed to be an ink jet recording head with which ink for ink jet recording includes a color, a humectant, a penetrant, water, and a water-soluble substance which undergoes condensation polymerization without water is used.

Furthermore, a material containing a hydrogen ion releasing additive is used for at least part of the ink jet head with which the ink for ink jet recording comes in contact, and solubility of the water-soluble substance is maintained even when an element of the material containing the additive is eluted into the ink for ink jet recording.

Thus, although hydrogen ions are generated in the ink by the element eluted from the material used for at least part of the ink jet head with which the ink for ink jet recording comes in contact, the solubility of the water-soluble substance is maintained. Therefore, the ink which has been in contact with the material for a long time does not become gelled. Accordingly, ink properties are not changed for a long time, i.e., the ink properties can be maintained.

Moreover, in the ink jet recording head, a material containing a hydrogen ion releasing additive is used for at least part of the ink jet head with which the ink for ink jet recording comes in contact, and the content of the additive in the material is controlled to be 0.1% by mass or less.

In this case, although hydrogen ions are generated in the ink by the element eluted from the material used for at least part of the ink jet head with which the ink for ink jet recording comes in contact, the content of the additive in the material is controlled to be 0.1% by mass or less and the hydrogen ion concentration in the ink is controlled to be within a predetermined range. Accordingly, even though the ink has been in contact with the material for a long time, the amount of hydrogen ions to be absorbed is not so much that the interaction between the water-soluble substance which undergoes condensation polymerization without water and the color is strengthened. Therefore, the ink does not become gelled.

Moreover, the content of the hydrogen ion releasing additive in the material is preferably 0.001% by mass or more.

In such a case, by making the material contain the additive in an amount of 0.001% or more, for example, the thermal stability, light stability, moldability of the material can be ensured.

Moreover, the material containing the hydrogen ion releasing additive is preferably resin or rubber.

In such a case, the concentration of hydrogen ions generated by an element eluted from a material such as resin or rubber can be controlled to be within a predetermined range. Therefore, gelation of ink can be effectively prevented.

Moreover, the water-soluble substance is preferably a hydrolyzable silane compound.

In such a case, even though the ink has been in contact with the material for a long time, not so many hydrogen ions are absorbed, so that the interaction between the hydrolyzable silane compound and the color is not strengthened. Therefore, the ink does not become gelled.

Moreover, the additive preferably includes at least one of an acid, a ketone, and a functional group of ester each of which exhibits acidic properties.

In such a case, hydrogen ions are easily generated by an element eluted from a material to which the additive is added. However, since the content of the additive in the material is controlled, the hydrogen ion concentration can be controlled to be within a predetermined range. Therefore, gelation of ink can be effectively prevented.

Moreover, the color is preferably a dye including an anion group and the water-soluble substance is preferably a hydrolyzable silane compound including an amino group.

In such a case, an amino group of the hydrolyzable silane compound is weakly interacts with an anion group of a dye. However, the concentration of hydrogen ions generated by an element eluted from a material for at least part of the ink jet head with which ink comes in contact can be controlled to be within a predetermined range. Therefore, the amount of hydrogen ions to be absorbed by the amino group is not so much that the interaction between the hydrolyzable silane compound and the color is strengthened. Therefore, the ink does not become gelled.

In the present invention, an ink cartridge is assumed to be an ink cartridge with which ink for ink jet recording including a color, a humectant, a penetrant, water, and a water-soluble substance which undergoes condensation polymerization without the water is used.

Furthermore, a material containing a hydrogen ion releasing additive is used for at least part of the ink cartridge with which the ink for ink jet recording comes in contact, and solubility of the water-soluble substance is maintained even when an element of the material containing the additive is eluted into the ink for ink jet recording.

Thus, although hydrogen ions are generated by the element eluted from the material used for at least part of the ink cartridge with which the ink comes in contact, the solubility of the water-soluble substance is maintained. Therefore, the ink which has been in contact with the material for a long time does not become gelled.

Moreover, in the ink cartridge, a material containing a hydrogen ion releasing additive is used for at least part of the ink cartridge with which the ink for ink jet recording comes in contact, and the content of the additive in the material is controlled to be 0.1% by mass or less.

In this case, although hydrogen ions are generated in the ink by the element eluted from the material used for at least part of the ink cartridge with which ink comes in contact, the content of the hydrogen ion releasing additive in the material is controlled to be 0.1% by mass or less, and thus the hydrogen ion concentration in the ink is controlled to be within a predetermined range. Accordingly, even though the ink has been in contact with the material for a long time, the amount of hydrogen ions to be absorbed is not so much that the interaction between the water-soluble substance which undergoes condensation polymerization without water and the color is strengthened. Therefore, the ink does not become gelled.

Moreover, the content of the hydrogen ion releasing additive in the material is preferably 0.001% by mass or more.

In such a case, by making the material contain the additive, for example, the thermal stability, light stability, moldability of the material can be ensured.

Moreover, the material containing the hydrogen ion releasing additive is preferably resin or rubber.

In such a case, the concentration of hydrogen ions generated by an element eluted from a material such as resin or rubber can be controlled to be within a predetermined range. Therefore, gelation of ink can be effectively prevented.

Moreover, the water-soluble substance is preferably a hydrolyzable silane compound.

In such a case, even though the ink has been in contact with the material for a long time, the amount of hydrogen ions to be absorbed is not so much that the interaction between the hydrolyzable silane compound and the color is strengthened. Therefore, the ink does not become gelled.

Moreover, the additive preferably includes at least one of an acid, a ketone, and a functional group of ester each of which exhibits acidic properties.

In such a case, hydrogen ions are easily generated by an element eluted from a material to which the additive is added. However, since the content of the additive in the material is controlled, the hydrogen ion concentration can be controlled to be within a predetermined range. Therefore, gelation of ink can be effectively prevented.

Moreover, the color is preferably a dye including an anion group and the water-soluble substance is preferably a hydrolyzable silane compound including an amino group.

In such a case, an amino group of the hydrolyzable silane compound and an anion group of a dye are weakly interacting. However, the concentration of hydrogen ions generated by an element eluted from a material for at least part of a member of an ink jet cartridge with which ink comes in contact can be controlled to be within a predetermined range. Therefore, the amount of hydrogen ions to be absorbed by the amino group is not so much that the interaction between the hydrolyzable silane compound and the color is strengthened. Therefore, the ink does not become gelled.

In the present invention, a recording apparatus is assumed to be a recording apparatus with which ink for ink jet recording including a color, a humectant, a penetrant, water, and a water-soluble substance which undergoes condensation polymerization without the water is used.

Furthermore, a material containing a hydrogen ion releasing additive is used for at least part of the recording apparatus with which the ink for ink jet recording comes in contact, and solubility of the water-soluble substance is maintained even when an element of the material containing the additive is eluted into the ink for ink jet recording.

Thus, although hydrogen ions are generated in the ink by the element eluted from the material used for at least part of the recording apparatus with which the ink comes in contact, the solubility of the water-soluble substance is maintained and thus the ink which has been in contact with the material for a long time does not become gelled.

Moreover, in the recording apparatus, a material containing a hydrogen ion releasing additive is used for at least part of the recording apparatus with which the ink comes in contact, and the content of the additive in the material is controlled to be 0.1% by mass or less.

In this case, although hydrogen ions are generated in the ink by the element eluted from the material used for at least part of the recording apparatus with which the ink comes in contact, the content of the hydrogen ion releasing additive in the material is controlled to be 0.1% by mass or less and thus the hydrogen ion concentration is controlled to be within a predetermined range. Accordingly, even though the ink has been in contact with the material for a long time, the amount of hydrogen ions to be absorbed is not so much that the interaction between the water-soluble substance which undergoes condensation polymerization without water and the color is strengthened. Therefore, the ink does not become gelled.

Moreover, the content of the hydrogen ion releasing additive in the material is preferably 0.001% by mass or more.

In such a case, by making the material contain the additive, for example, the thermal stability, light stability, moldability of the material can be ensured.

Moreover, the material containing the hydrogen ion releasing additive is preferably resin or rubber.

In such a case, the concentration of hydrogen ions generated by an element eluted from a material such as resin or rubber can be controlled to be within a predetermined range. Therefore, gelation of ink can be effectively prevented.

Moreover, the water-soluble substance is preferably a hydrolyzable silane compound.

In such a case, even though the ink has been in contact with the material for a long time, the amount of hydrogen ions to be absorbed is not so much that the interaction between the hydrolyzable silane compound and the color is strengthened. Therefore, the ink does not become gelled.

Moreover, the additive preferably includes at least one of an acid, a ketone, and a functional group of ester each of which exhibits acidic properties.

In such a case, hydrogen ions are easily generated by an element eluted from a material to which the additive is added. However, since the content of the additive in the material is controlled, the hydrogen ion concentration can be controlled to be within a predetermined range. Therefore, gelation of ink can be effectively prevented.

Moreover, the color is preferably a dye including an anion group and the water-soluble substance is preferably a hydrolyzable silane compound including an amino group.

In such a case, an amino group of the hydrolyzable silane compound interacts with an anion group of a dye. However, the concentration of hydrogen ions generated by an element eluted from a material for at least part of the recording apparatus with which the ink comes in contact can be controlled to be within a predetermined range. Therefore, the amount of hydrogen ions to be absorbed by the amino group is not so much that the interaction between the hydrolyzable silane compound and the color is strengthened. Therefore, the ink does not become gelled.

BEST MODE FOR CARRYING OUT THE INVENTION

Figure 1:
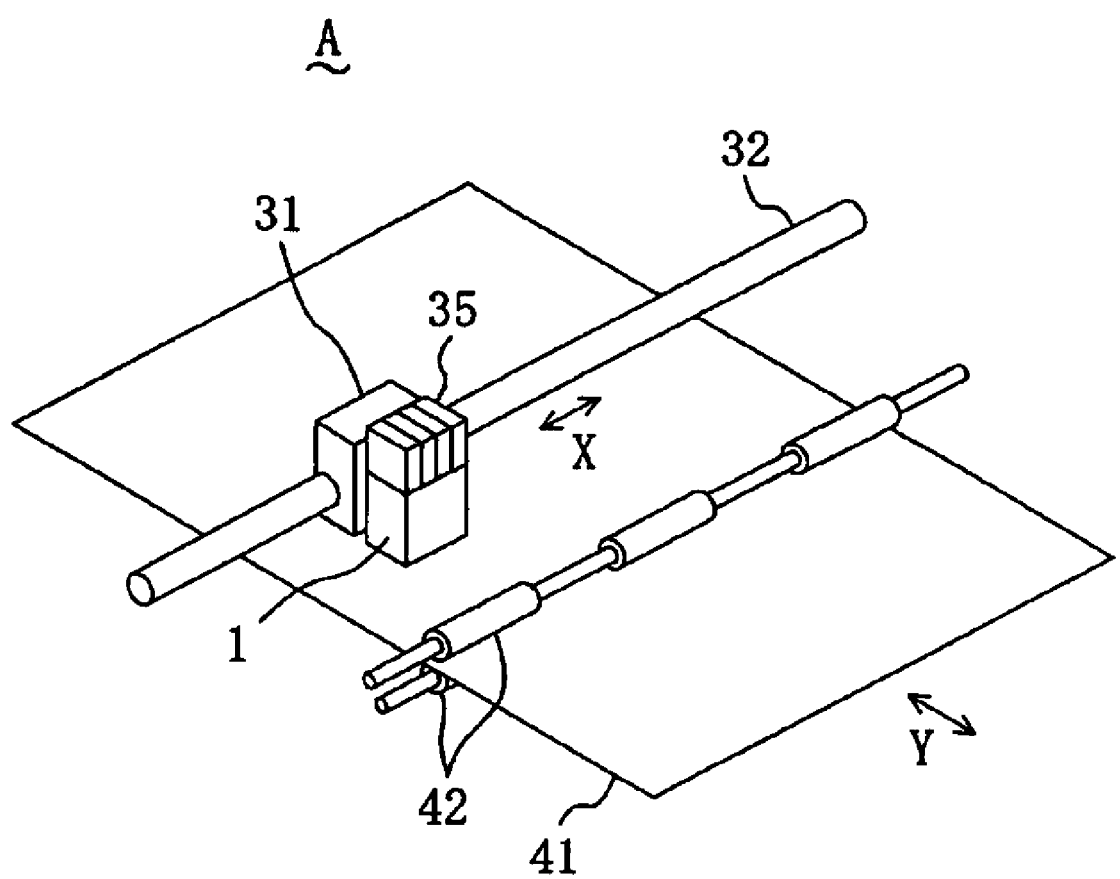
FIG. 1 is an oblique view illustrating main parts of a recording apparatus according to one of embodiments of the present invention.

Embodiments of the present invention will be described with reference to FIG. 1 and other accompanying drawings. FIG. 1 schematically illustrates an ink jet type recording apparatus A including ink for use in ink jet recording according to one embodiment of the present invention. The recording apparatus A is equipped with an ink cartridge 35 that is formed of resin and includes the ink on its upper surface, and includes an ink jet head 1 which discharges the ink onto recording paper 41 as a recording medium in the following manner. The ink jet head 1 is fixedly supported on a carriage 31 on which a carriage motor (not shown) is provided. Being guided by a carriage shaft 32 extending in the primary scanning direction (i.e., the X direction shown in FIGS. 1 and 2), the ink jet head 1 and the carriage 31 are reciprocated by the carriage motor in the primary scanning direction. The carriage 31, the carriage shaft 32 and the carriage motor together form relative movement means for relatively moving the ink jet head 1 and a recording paper 41 with respect to each other in the primary scanning direction.

The recording paper 41 is put between two carrier rollers 42, 42 which are rotated by a carrier motor (not shown), and is carried by the carrier motor and the carrier rollers 42 under the ink jet head 1 in the secondary scanning direction (i.e., the Y direction shown in FIGS. 1 and 2) which is perpendicular to the primary scanning direction. The carrier motor and the carrier rollers 42 together form relative movement means for relatively moving the ink jet head 1 and the recording paper 41 with respect to each other in the secondary scanning direction.

Figure 2:
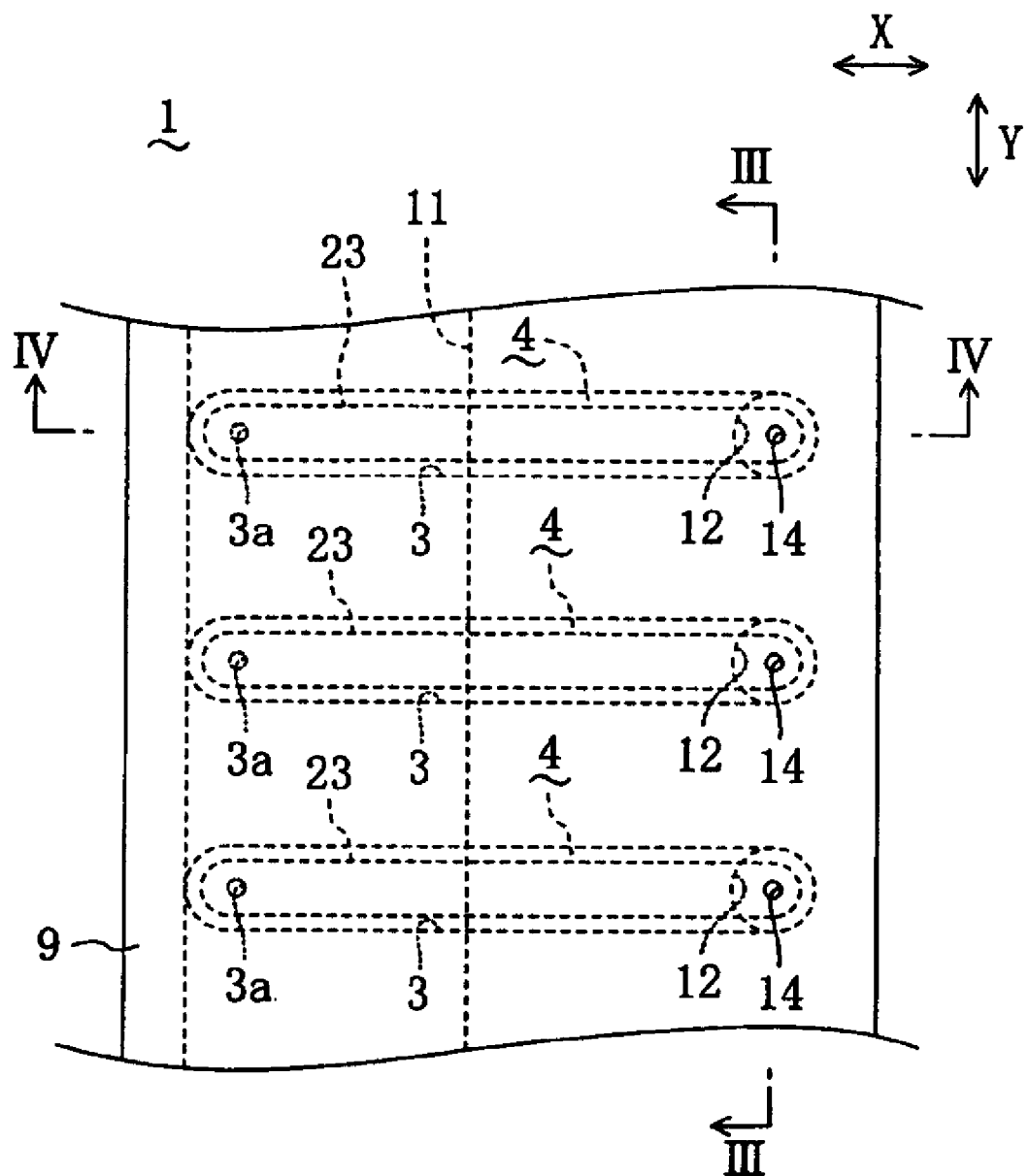
FIG. 2 is a diagram illustrating part of the lower surface of an ink jet head.
Figure 3:
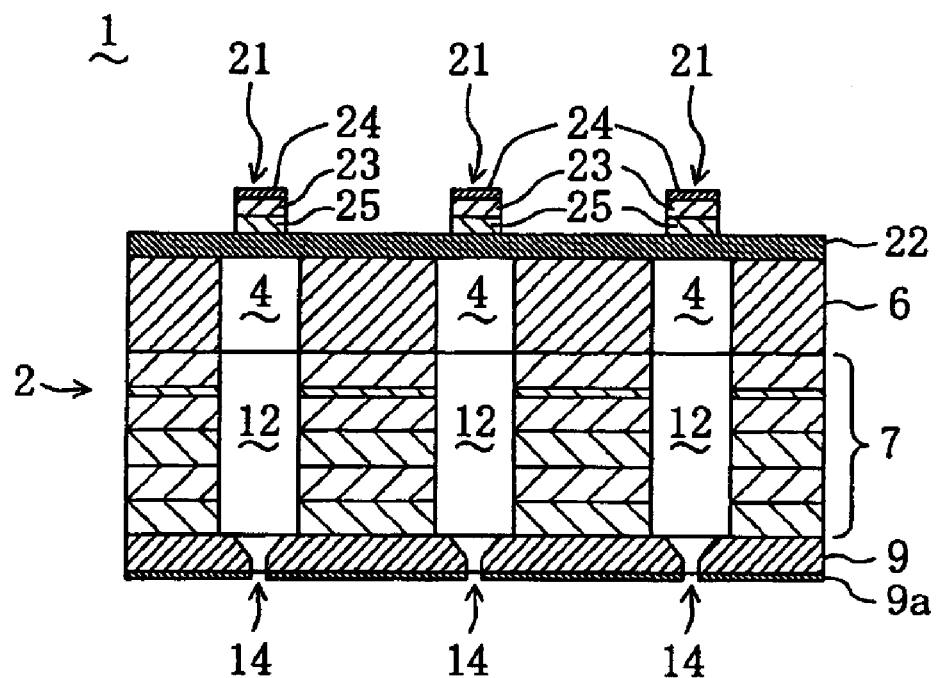
FIG. 3 is a cross-sectional view taken along the line III—III of FIG. 2.
Figure 4:
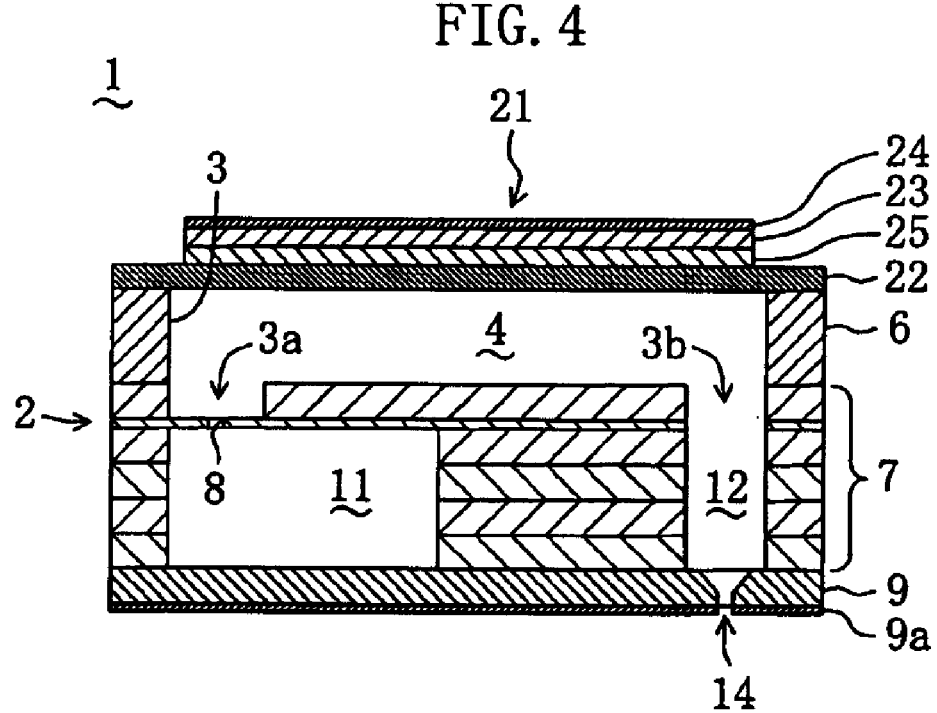
FIG. 4 is a cross-sectional view taken along the line IV—IV of FIG. 2.
Figure 5:
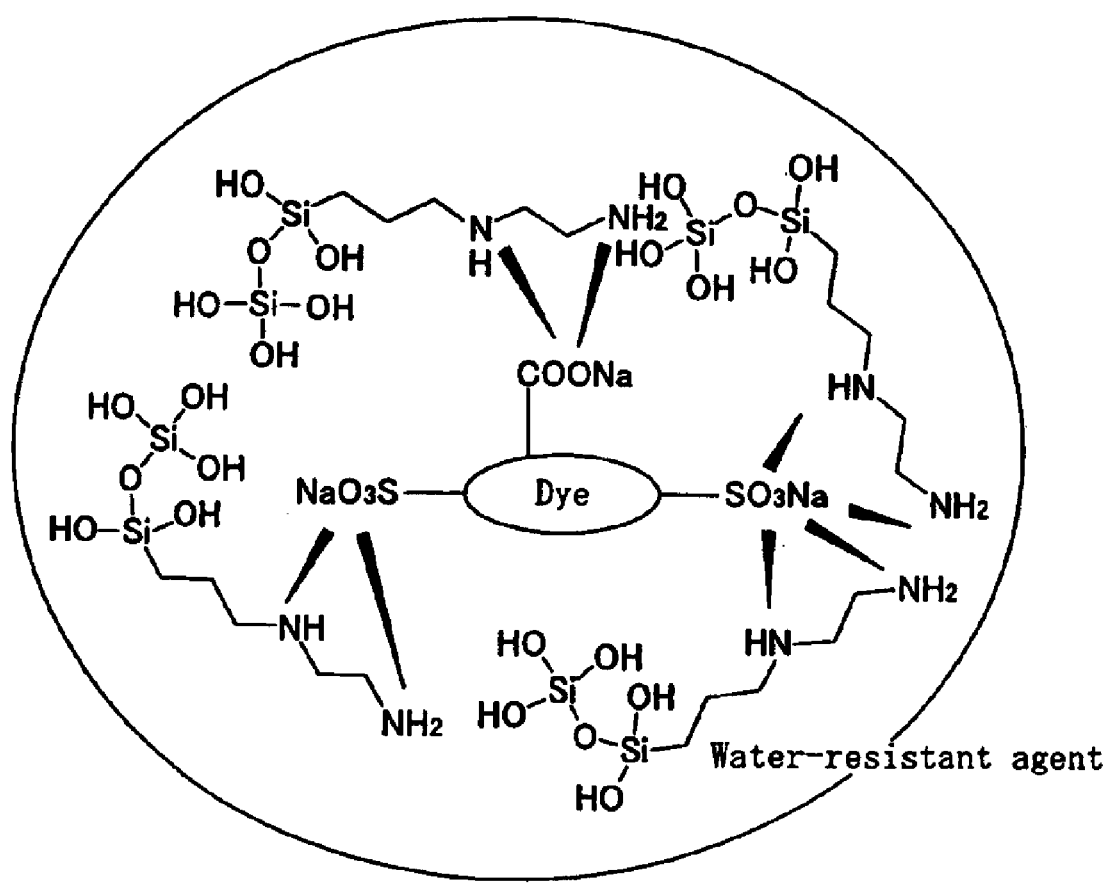
FIG. 5 is a schematic perspective view illustrating main components of ink.
Figure 6:
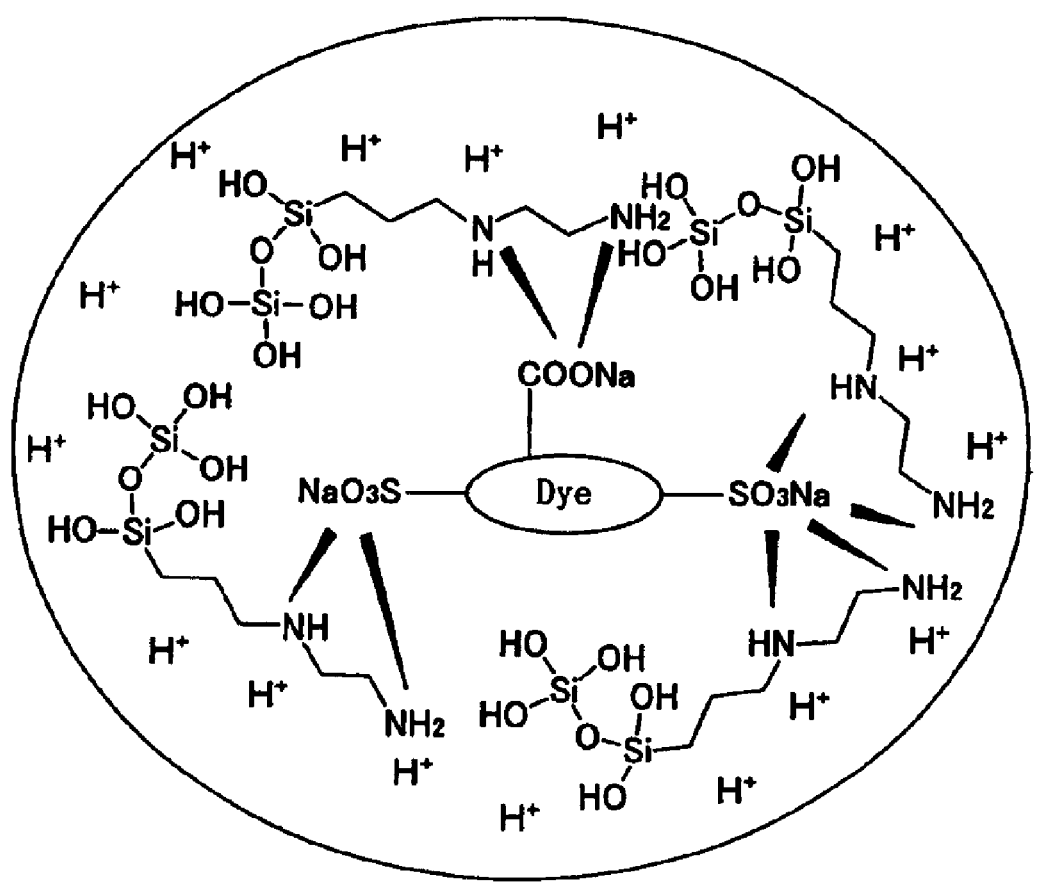
FIG. 6 is a schematic perspective view illustrating the main components of the ink when hydrogen ions are generated.

The ink jet head 1 includes, as shown in FIGS. 2 through 4, a head body 2 in which a plurality of pressure chambers 4 each having a supply port 3a through which ink is supplied and a discharge port 3b through which ink is discharged. A side wall portion of each of the pressure chambers 4 of the head body 2 includes a pressure chamber member 6 formed of photosensitive glass having a thickness of about 200 $\mu$m. A bottom wall portion of each of the pressure chambers 4 is fixedly adhered to the lower surface of the pressure chamber member 6 and includes an ink channel member 7 in which six thin stainless steel plates are stacked.

In the pressure chamber member 6, a plurality of openings 3 are formed so as to separate the pressure chambers 4 from each other. The openings 3 are formed on the upper surface of the head body 2 so as to extend in the primary scanning direction and be substantially equally spaced from each other in the secondary scanning direction. Each of the openings 3 is set to have a length of about 1250 $\mu$m and a width of about 130 $\mu$m. Note that both of end portions of each of the openings 3 have a semicircular shape.

In the ink channel member 7, a plurality of orifices 8 each of which is to be the supply port 3a and an ink supply channel 11 connected to the orifices 8 and extending in the secondary scanning direction, and a plurality of ink discharge channels 12 each of which is connected to the discharge port 3b.

Each of the orifices 8 is formed on the second one from the top of the six stainless steel plates forming the ink channel member 7 which is thinner than the others, and has a diameter of about 38 $\mu$m. The ink supply channel 11 is communicated to the ink cartridge 35 so that the ink is supplied from the ink cartridge 35 into the ink supply channel 11 via a resin tube (not shown).

A nozzle plate 9 which is formed of a stainless steel and in which a plurality of nozzles 14 for discharging ink onto the recording paper 41 are formed is fixedly adhered to the lower surface of the ink channel member 7. The lower surface of the nozzle plate 9 is coated by a water-repellent film 9a. Each of the nozzles 14 is connected to the associated one of the ink discharge channels 12, and it is communicated to the associated one of the pressure chambers 4 via the ink discharge channel 12. The nozzles 14 are formed so as to be in a row in the secondary direction on the lower surface of the ink jet head 1. Note that each of the nozzles 14 includes a tapered portion in which the nozzle diameter gradually decreases toward the tip and a straight portion provided at the nozzle tip of the tapered portion. The nozzle diameter of the straight portion is set at about 20 $\mu$m.

Resin or rubber, as a material containing a hydrogen releasing additive, i.e., a material containing an additive which including an element generating hydrogen ions when eluted into ink, is used for at least parts of the ink cartridge 35, the tube through which ink is introduced to the ink supply channel 11 of the ink jet head 1, the adhesive used in the ink jet head 1 and other members of the recording apparatus with which ink comes in contact. The present invention is characterized in that the content of the additive in the material is adjusted to be within a range from not less than 0.001% by mass to not more than 0.1% by mass. Particularly, as for the ink cartridge 35 which is in contact with ink for a longer time than the ink jet head 1, the tube, or the like, a material to be used is important. Note that the structure of the ink cartridge 35 in which a material containing the additive is used for at least part of the ink cartridge with which ink comes in contact may be, e.g., a structure in which the ink cartridge 35 is formed of resin, a structure in which the ink cartridge 35 is formed by coating an ink cartridge body formed of a metal plate with resin, a structure in which part of the ink cartridge is formed of resin or rubber, or like structures.

A piezoelectric actuator 21 is provided over each of the openings 3 of the head body 2. Being fixedly adhered to the upper surface of the head body 2, the piezoelectric actuator 21 plugs up the associated one of the openings 3 of the head body 2, and have a vibration plate 22 which is formed of Cr and forms the pressure chamber 4 together with the opening 3. The vibration plate 22 is a single member shared by all of the piezoelectric actuators 21 and serves as a common electrode shared by all piezoelectric elements that will be described later.

Moreover, each of the piezoelectric actuators 21 includes a piezoelectric element 23 and a separate electrode 24 of Pt. Each of the piezoelectric elements 23 is formed of lead zirconate titanate (PZT) on the upper surface of the vibration plate 22 with an intermediate layer 25 of Cu interposed therebetween. More specifically, the piezoelectric elements 23 are located on parts of the surface (i.e., the upper surface) of the vibration plate 22 on which the pressure chambers 4 do not exit which correspond to the pressure chambers 4 (i.e., on parts thereof which oppose to the openings 3). The separate electrode 24 is provided to apply voltage (driving voltage) to the piezoelectric element 23 as well as the vibration plate 22.

Each of the vibration plate 22, the piezoelectric elements 23, the separate electrodes 24 and the intermediate layers 25 is formed of a thin film. The thickness of the vibration plate 22 is set to be about 6 $\mu$m, the thickness of each of the piezoelectric elements 23 is set to be about not more than 8 $\mu$m (e.g., about 3 $\mu$m), the thickness of each of the separate electrodes 24 is set to be about 0.2 $\mu$m, and the thickness of each of the intermediate layers 25 is set to be about 3 $\mu$m.

Each of the piezoelectric actuators 21 applies a driving voltage to the separate electrode 24 to affect part of the vibration plate 22 corresponding to each of the pressure chambers 4 through the piezoelectric element 23 and the intermediate layer 25, thus resulting in deformation of the part. Thus, ink in the pressure chambers 4 is discharged through the nozzles 14. More specifically, when a pulse voltage is applied between the vibration plate 22 and each of the separate electrodes 24, each of the piezoelectric elements 23 contracts in the width direction which is perpendicular to the thickness direction at each rising edge of the pulse voltage through a piezoelectric effect. On the other hand, the vibration plate 22, the separate electrodes 24 and the intermediate layers 25 do not contract. Accordingly, the parts of the vibration plate 22 corresponding to the pressure chambers 4 are bent toward the pressure chambers 4 to be deformed through a so-called "bimetal effect". The bending deformation generates a pressure in the pressure chambers 4. By this pressure, ink in the pressure chambers 4 is discharged in the form of an ink droplet from the nozzles 14 onto the recording paper 41 via the ink discharge ports 3b and the ink discharge channels 12. Then, the ink droplet is attached to the recording paper 41 in the form of a dot.

At each falling edge of the pulse voltage, the piezoelectric elements 23 expand and then the parts of the vibration plate 22 corresponding to the pressure chambers 4 return to their original shape. At this time, the pressure chambers 4 are refilled with ink supplied from the ink cartridge 35 via the ink supply channel 11 and the ink supply port 3a. Note that as a pulse voltage applied to each of the piezoelectric elements 23, not only the push-pull type pulse voltage described above but also a pull-push type pulse voltage that falls from a first voltage to a second voltage lower than the first voltage and then rises again to the first voltage, or other types of pulse voltages may be used.

A driving voltage is applied to each of the piezoelectric elements 23 at intervals of a predetermined time while the ink jet head 1 and the carriage 31 are moved from one end to the other of the recording paper 41 in the primary scanning direction at a constant speed (e.g., at a speed of about 50 µs: driving frequency 20 kHz). Note that the voltage is not applied if the ink jet head 1 has reached to a point where the recording paper 41 is not supposed to receive an ink droplet. In this manner, ink droplets land on predetermined parts of the recording paper 41. After a line has been scanned and recorded, the recording paper 41 is carried for a predetermined amount in the secondary scanning direction by the carriage motor and each of the carriage rollers 42. Then, ink droplets are discharged while the ink jet head 1 and the carriage 31 are moved in the primary scanning direction again to scan and record a next line. By repeating the above-described operation, a desired image is formed overall on the recording paper 41.

Ink used for the recording apparatus A includes a water-soluble dye as a color, a humectant for preventing the ink from drying in the nozzles 14 of the ink jet head 1 or the like, a penetrant for facilitating permeation of the ink into the recording paper 41, water, and a hydrolyzable silane compound as a water-soluble substance which undergoes condensation polymerization without the water.

The water-soluble dye is preferably a dye including an anion group, i.e., an anion-containing-functional group such as an acid dye, a direct dye, or the like. In general, one or more of —SO3M and —COOM (where M=H, NH4, alkali metal, or the like) is contained in a water-soluble acid dye or a direct dye for the purpose of making the dye have hydrophile properties. Note that the ink may contain a pigment as a color.

The humectant is preferably polyhydric alcohol such as glycerin, a water-soluble nitrogen heterocyclic compound or the like.

The penetrant is preferably monoalkyl ether such as diethylene glycol monobutyl ether, which is a type of polyhydric alcohol. Note that the content of monoalkyl ether which is a type of polyhydric alcohol is preferably 1 to 50% by mass with respect to the whole mass of ink. The reason for this is as follows. If the content of monoalkyl ether which is a type of polyhydric alcohol is 1% or less, the effect of permeating ink into the recording paper 41 can not be sufficiently attained. On the other hand, if it is 50% or more, the water-solubilities of the dye and the silane compound will be reduced.

The silane compound has the function of improving water-resistance of ink. More specifically, when ink droplets discharged from the nozzles 14 of the ink jet head 1 are adhered onto the recording paper 41, water in the ink evaporates or permeates into the recording paper 41. Then, the silane compound in ink droplets undergoes condensation polymerization and encloses a part or the whole body of a dye molecule. Thus, even though an image on the recording paper 41 is wet with water, the dye is prevented from being eluted into the water.

The silane compound is preferably a hydrolyzed product obtained by hydrolyzing alkoxysilane containing an amino group-containing organic group and alkoxysilane containing no amino group, or an organic silicon compound obtained by hydrolyzing hydrolyzable silane which is obtained by reacting amino-group-containing hydrolyzable silane with an organic monoepoxy compound and hydrolyzable silane containing no nitrogen atoms, or the like (e.g., Japanese Unexamined Patent Publication No. 11-293167 and Japanese Unexamined Patent Publication No. 10-212439).

Accordingly, in the recording apparatus A having the above-described structure according to the embodiment, the content of an additive in a material, such as resin or rubber, which is used for at least part of the apparatus with which ink comes in contact is controlled to be 0.1% or less. Thus, if the recording apparatus is stored with the parts of members thereof being in contact with the ink for a long time, hydrogen ions may be generated in the ink by the elution of elements from the material. However, even in such a case, the hydrogen ion concentration in the ink is in a predetermined range and therefore hydrogen ions are hardly absorbed by the amino group, so that the interaction of the amino group of the silane compound and an anion group of the dye is not strengthened. As a result, the ink is prevented from being gelled. Moreover, the material contains the additive of a content of 0.001% or more, and thus thermal stability, optical stability, and formability of the material, such as resin or rubber, can be ensured.

EXAMPLE

Next, specific examples of the embodiment will be described.

First, two types of wet ink were prepared. A first type of ink (which will be referred to as "water-resistant ink A") was water-resistant ink having the following composition in term mass percentage.

| | |
|---|---|
| Pure water | 75% |
| C.I. acid black 2 | 5% |
| Organic silicon compound (A) | 5% |
| Diethylene glycol monobutyl ether | 5% |
| Glycerin | 10% |

The organic silicon compound (A) was synthesized in the following manner. First, 120 g (6.67 mol) of water was put into a reaction vessel. Then, a mixture of $(CH_3)_2NCH_2CH_2CH_2Si(OCH_3)_3$ of 0.2 mol and $CH_3Si(OCH_3)_3$ of 0.1 mol was added to the water drop by drop, and the water and the mixture were reacted at 60° C. for 1 hour to obtain the organic silicon compound (A).

A second type of ink (which will be hereinafter referred to as "water-resistant ink B") was water-resistant ink having the following composition in mass percentage.

| | |
|---|---|
| Pure water | 75% |
| C.I. acid black 2 | 5% |
| Organic silicon compound (B) | 5% |
| Diethylene glycol monobutyl ether | 5% |
| Glycerin | 10% |

The organic silicon compound (B) was synthesized in the following manner. First, 120 g (6.67 mol) of water was put into a reaction vessel. Then, a mixture of $H_2NCH_2CH_2HNCH_2CH_2CH_2Si(OCH_3)_3$ of 0.2 mol and $Si(OCH_3)_4$ of 0.1 mol was added to the water drop by drop, and the water and the mixture were reacted at 60° C. for 1 hour to obtain the organic silicon compound (B).

As shown in Tables 1 through 6, from typical materials used for forming the recording apparatus A, selected were five different materials as materials for members of the recording apparatus A with which ink would come in contact. Specifically, the selected five materials were ethylene propylene rubber, butyl rubber, nitrile rubber, polystyrene, and polyethylene. Stearic acid which is a type of fatty acids, is a chemical element and exhibits acidic properties, acetylacetone which is a type of ketone, and butyl stearate which is a type of fatty acid ester and is hydrolyzed at the alkali side were prepared as additives. Note that particularly highly reactive additives were selected as additives in this case.

In Examples 1 through 6, samples were formed by adding an additive (stearic acid, acetylacetone or butyl stearate) of 0.1% by mass to ethylene propylene rubber. Each of the samples was immersed in the water-resistant ink A or B, and then was subjected to an ink contact test.

In Examples 7 and 8, samples were formed of ethylene propylene rubber without adding any additive. Each of the samples was immersed in the water-resistant ink A or B, and then was subjected to an ink contact tests.

In Examples 9 through 14, samples obtained by adding to ethylene propylene rubber two types of additives (i.e., any two of stearic acid, acetylacetone, and butyl stearate) each in an amount of 0.05% by mass were formed. That is to say, the additives were contained in a total amount of 0.1% in each of Examples 9 through 14. Each of the samples was immersed in the water-resistant ink A or B, and then was subjected to an ink contact test.

In Examples 15 through 20, samples obtained by adding to butyl rubber two types of additives each in an amount of 0.05% by mass were formed in the same manner as described above. That is to say, the additives were contained in a total amount of 0.1% in each of Examples 15 through 20. Each of the samples was immersed in the water-resistant ink A or B, and then was subjected to an ink contact test.

In Examples 21 through 23, samples obtained by adding to nitrile rubber two types of additives each in an amount of 0.05% by mass were formed in the same manner as described above. That is to say, the additives were contained in a total amount of 0.1% in each of 21 through 23. Each of the samples was immersed in the water-resistant ink A, and then was subjected to an ink contact test.

In Examples 24 through 26, samples obtained by adding to polystyrene two types of additives each in an amount of 0.05% by mass were formed in the same manner as described above. That is to say, the additives were contained in a total amount of 0.1% in each of Examples 24 through 26. Each of the samples was immersed in the water-resistant ink A, and then was subjected to ink contact test.

In Examples 27 through 29, samples obtained by adding to polyurethane two types of additives each in an amount of 0.05% by mass were formed in the same manner as described above. That is to say, the additives were contained in a total amount of 0.1% in each of Examples 27 through 29. Each of the samples was immersed in the water-resistant ink A, and then was subjected to an ink contact test.

TABLE 1

| | | | Additives | | | |
|---|---|---|---|---|---|---|
| Examples | Warter-resistant inks | Names of materials | Fatty acid type Stearic acid | Ketone type Acetylacetone | Ester type Butyl stearate | Post ink-contact (gelled) |
| Example 1 | (A) | Ethylene propylene rubber | 0.1% by mass | Not added | Not added | No |
| Example 2 | (B) | Ethylene propylene rubber | 0.1% by mass | Not added | Not added | No |
| Example 3 | (A) | Ethylene propylene rubber | Not added | 0.1% by mass | Not added | No |
| Example 4 | (B) | Ethylene propylene rubber | Not added | 0.1% by mass | Not added | No |
| Example 5 | (A) | Ethylene propylene rubber | Not added | Not added | 0.1% by mass | No |
| Example 6 | (B) | Ethylene propylene rubber | Not added | Not added | 0.1% by mass | No |
| Example 7 | (A) | Ethylene propylene rubber | Not added | Not added | Not added | No |
| Example 8 | (B) | Ethylene propylene rubber | Not added | Not added | Not added | No |
| Example 9 | (A) | Ethylene propylene rubber | 0.05% by mass | 0.05% by mass | Not added | No |
| Example 10 | (B) | Ethylene propylene rubber | 0.05% by mass | 0.05% by mass | Not added | No |

TABLE 2

| Examples | Warter-resistant inks | Names of materials | Additives | | | Post ink-contact (gelled) |
|---|---|---|---|---|---|---|
| | | | Fatty acid type Stearic acid | Ketone type Acetylacetone | Ester type Butyl stearate | |
| Example 11 | (A) | Ethylene propylene rubber | 0.05% by mass | Not added | 0.05% by mass | No |
| Example 12 | (B) | Ethylene propylene rubber | 0.05% by mass | Not added | 0.05% by mass | No |
| Example 13 | (A) | Ethylene propylene rubber | Not added | 0.05% by mass | 0.05% by mass | No |
| Example 14 | (B) | Ethylene propylene rubber | Not added | 0.05% by mass | 0.05% by mass | No |
| Example 15 | (A) | Butyl rubber | 0.05% by mass | 0.05% by mass | Not added | No |
| Example 16 | (B) | Butyl rubber | 0.05% by mass | 0.05% by mass | Not added | No |
| Example 17 | (A) | Butyl rubber | 0.05% by mass | Not added | 0.05% by mass | No |
| Example 18 | (B) | Butyl rubber | 0.05% by mass | Not added | 0.05% by mass | No |
| Example 19 | (A) | Butyl rubber | Not added | 0.05% by mass | 0.05% by mass | No |
| Example 20 | (B) | Butyl rubber | Not added | 0.05% by mass | 0.05% by mass | No |

TABLE 3

| Examples | Warter-resistant inks | Names of materials | Additives | | | Post ink-contact (gelled) |
|---|---|---|---|---|---|---|
| | | | Fatty acid type Stearic acid | Ketone type Acetylacetone | Ester type Butyl stearate | |
| Example 21 | (A) | Nitrile rubber | 0.05% by mass | 0.05% by mass | Not added | No |
| Example 22 | (A) | Nitrile rubber | 0.05% by mass | Not added | 0.05% by mass | No |
| Example 23 | (A) | Nitrile rubber | Not added | 0.05% by mass | 0.05% by mass | No |
| Example 24 | (A) | polystyrene | 0.05% by mass | 0.05% by mass | Not added | No |
| Example 25 | (A) | polystyrene | 0.05% by mass | Not added | 0.05% by mass | No |
| Example 26 | (A) | polystyrene | Not added | 0.05% by mass | 0.05% by mass | No |
| Example 27 | (A) | polyurethane | 0.05% by mass | 0.05% by mass | Not added | No |
| Example 28 | (A) | polyurethane | 0.05% by mass | Not added | 0.05% by mass | No |
| Example 29 | (A) | polyurethane | Not added | 0.05% by mass | 0.05% by mass | No |

As shown in Table 4 through 6, in Comparative Examples 1 through 4, samples were formed by adding as an additive stearic acid in an amount of 0.2–1.0% by mass to ethylene propylene rubber. Each of the samples was immersed in the water-resistant ink A or B, and then was subjected to an ink contact test.

In Comparative Examples 5 through 8, samples were formed by adding as an additive acetylacetone in an amount of 0.2–1.0% by mass to ethylene propylene rubber. Each of the samples was immersed in the water-resistant ink A or B, and then was subjected to an ink contact test.

In Comparative Examples 9 through 12, samples were formed by adding as an additive butyl stearate in an amount of 0.2–1.0% by mass to ethylene propylene rubber. Each of the samples was immersed in the water-resistant ink A or B, and then was subjected to an ink contact test.

In Comparative Example 13, a sample was formed by adding as additives stearic acid, acetylacetone, and butyl stearate each in an amount of 0.2% by mass to ethylene propylene rubber. That is to say, the additives were contained in a total amount of 0.6% in Comparative Example 13. The sample was immersed in the water-resistant ink A, and then was subjected to an ink contact test.

In Comparative Example 14, a sample was formed by adding as additives stearic acid, acetylacetone, and butyl stearate each in an amount of 0.1% by mass to ethylene propylene rubber. That is to say, the additives were contained in a total amount of 0.3% in Comparative Example 14. The sample was immersed in the water-resistant ink A, and then was subjected to an ink contact test.

In Comparative Examples 15 through 17, samples were formed by adding as additives any two of stearic acid, acetylacetone, and butyl stearate each in an amount of 0.1% by mass to ethylene propylene rubber. That is to say, the additives were contained in a total amount of 0.2% in each of Comparative Examples 15 through 17. Each of the samples was immersed in the water-resistant ink A, and then was subjected to an ink contact test.

In Comparative Examples 18 and 19, samples were formed by adding as additives stearic acid, acetylacetone, and butyl stearate each in an amount of 0.1% by mass to butyl rubber. That is to say, the additives were contained in a total amount of 0.3% in each of Comparative Examples 18 and 19. Each of the samples was immersed in the water-resistant ink A or B, and then was subjected to an ink contact test.

In Comparative Examples 20 and 21, samples were formed by adding as additives stearic acid, acetylacetone, and butyl stearate each in an amount of 0.1% by mass to nitrile rubber. That is to say, the additives were contained in a total amount of 0.3% in each of Comparative Examples 20 and 21. Each of the samples was immersed in the water-resistant ink A or B, and then was subjected to an ink contact test.

In Comparative Examples 22 and 23, samples were formed by adding as additives stearic acid, acetylacetone, and butyl stearate each in an amount of 0.1% by mass to polystyrene. That is to say, the total additives were in a total amount of 0.3% contained in each of Comparative Examples 22 and 23. Each of the samples was immersed in the water-resistant ink A or B, and then was subjected to an ink contact test.

In Comparative Examples 24 and 25, samples were formed by adding as additives stearic acid, acetylacetone, and butyl stearate each in an amount of 0.1% by mass to polyurethane. That is to say, the total additives in an amount of 0.3% were contained in each of Comparative Examples 24 and 25. Each of the samples was immersed in the water-resistant ink A or B, and then was subjected to an ink contact test.

In Comparative Examples 26 through 28, samples were formed by adding as an additive stearyl alcohol in an amount of 0.5–1.0% by mass to ethylene propylene rubber. The sample was immersed in the water-resistant ink A or B, and then was subjected to an ink contact test.

TABLE 4

| Comparative Examples | Water-resistant inks | Names of materials | Additives | | | | Post ink-contact (gelled) |
| | | | Fatty acid type Stearic acid | Ketone type Acetyl acetone | Ester type Butyl stearate | Alcohol type Stearyl alcohol | |
| --- | --- | --- | --- | --- | --- | --- | --- |
| Comparative Example 1 | (A) | Ethylene propylene rubber | 1.0% by mass | Not added | Not added | Not added | Yes |
| Comparative Example 2 | (A) | Ethylene propylene rubber | 0.5% by mass | Not added | Not added | Not added | Yes |
| Comparative Example 3 | (A) | Ethylene propylene rubber | 0.2% by mass | Not added | Not added | Not added | Yes |
| Comparative Example 4 | (B) | Ethylene propylene rubber | 0.2% by mass | Not added | Not added | Not added | Yes |
| Comparative Example 5 | (A) | Ethylene propylene rubber | Not added | 1.0% by mass | Not added | Not added | Yes |
| Comparative Example 6 | (A) | Ethylene propylene rubber | Not added | 0.5% by mass | Not added | Not added | Yes |
| Comparative Example 7 | (A) | Ethylene propylene rubber | Not added | 0.2% by mass | Not added | Not added | Yes |
| Comparative Example 8 | (B) | Ethylene propylene rubber | Not added | 0.2% by mass | Not added | Not added | Yes |
| Comparative Example 9 | (A) | Ethylene propylene rubber | Not added | Not added | 1.0% by mass | Not added | Yes |
| Comparative Example 10 | (A) | Ethylene propylene rubber | Not added | Not added | 0.5% by mass | Not added | Yes |

TABLE 5

| Comparative Examples | Water-resistant inks | Names of materials | Additives | | | | Post ink-contact (gelled) |
| | | | Fatty acid type Stearic acid | Ketone type Acetyl acetone | Ester type Butyl stearate | Alcohol type Stearyl alcohol | |
| --- | --- | --- | --- | --- | --- | --- | --- |
| Comparative Example 11 | (A) | Ethylene propylene rubber | Not added | Not added | 0.2% by mass | Not added | Yes |
| Comparative Example 12 | (B) | Ethylene propylene rubber | Not added | Not added | 0.2% by mass | Not added | Yes |
| Comparative Example 13 | (A) | Ethylene propylene rubber | 0.2% by mass | 0.2% by mass | 0.2% by mass | Not added | Yes |
| Comparative Example 14 | (A) | Ethylene propylene rubber | 0.1% by mass | 0.1% by mass | 0.1% by mass | Not added | Yes |
| Comparative Example 15 | (A) | Ethylene propylene rubber | 0.1% by mass | 0.1% by mass | Not added | Not added | Yes |
| Comparative Example 16 | (A) | Ethylene propylene rubber | 0.1% by mass | Not added | 0.1% by mass | Not added | Yes |
| Comparative Example 17 | (A) | Ethylene propylene rubber | Not added | 0.1% by mass | 0.1% by mass | Not added | Yes |
| Comparative Example 18 | (A) | Butyl rubber | 0.1% by mass | 0.1% by mass | 0.1% by mass | Not added | Yes |
| Comparative Example 19 | (B) | Butyl rubber | 0.1% by mass | 0.1% by mass | 0.1% by mass | Not added | Yes |
| Comparative Example 20 | (A) | Ntrile rubber | 0.1% by mass | 0.1% by mass | 0.1% by mass | Not added | Yes |

TABLE 6

| Comparative Examples | Water-resistant inks | Names of materials | Additives | | | | Post ink-contact (gelled) |
|---|---|---|---|---|---|---|---|
| | | | Fatty acid type Stearic acid | Ketone type Acetyl acetone | Ester type Butyl stearate | Alcohol type Stearyl alcohol | |
| Comparative Example 21 | (B) | Ntrile rubber | 0.1% by mass | 0.1% by mass | 0.1% by mass | Not added | Yes |
| Comparative Example 22 | (A) | polystyrene | 0.1% by mass | 0.1% by mass | 0.1% by mass | Not added | Yes |
| Comparative Example 23 | (B) | polystyrene | 0.1% by mass | 0.1% by mass | 0.1% by mass | Not added | Yes |
| Comparative Example 24 | (A) | polyurethane | 0.1% by mass | 0.1% by mass | 0.1% by mass | Not added | Yes |
| Comparative Example 25 | (B) | polyurethane | 0.1% by mass | 0.1% by mass | 0.1% by mass | Not added | Yes |
| Comparative Example 26 | (A) | Ethylene propylene rubber | Not added | Not added | Not added | 1.0% by mass | No |
| Comparative Example 27 | (A) | Ethylene propylene rubber | Not added | Not added | Not added | 0.5% by mass | No |
| Comparative Example 28 | (B) | Ethylene propylene rubber | Not added | Not added | Not added | 1.0% by mass | No |

The ink-contact tests were performed in the following manner. Each of the samples of Examples 1 through 29 and Comparative Examples 1 through 28 was put into a closed vessel with either one of the water-resistant ink A and B and then was left to stand at 60° C. for 500 hours. Then, it was determined that the water-resistant ink was gelled when the viscosity, surface tension, and pH of the ink were different by over 10% before and after the sample and the ink had been left to stand.

Table 1 shows ink-contact test results. As for the samples formed by adding an additive (i.e., steatic acid, acetylacetone, or butyl stearate) to ethylene propylene rubber, neither the water-resistant ink A nor B was gelled in those of Examples 1 through 6 in which an additive of 0.1% by mass was contained in the sample, whatever the additive was. A possible reason for this is as follows. Assume that a small amount of an additive is contained in a sample. Even though hydrogen ions are generated by elution of the element into ink, the concentration of hydrogen ion in ink is within a predetermined range. Therefore, gelation will not occur.

In contrast, as for the samples formed by adding an additive (i.e., steatic acid, acetylacetone or butyl stearate) to ethylene propylene rubber, whatever the additive was, both of the water-resistant inks A and B were gelled in those of Comparative Examples 1 through 12 in which an additive of 0.2% by mass or more was contained in the sample, as shown in Tables 4 and 5.

That is to say, when a material to which single-element and acidic stearic acid or acetylacetone is added as an additive comes in contact with an alkaline water-resistant ink, stearic acid or acetylacetone is eluted into the water-resistant ink and hydrogen ions are generated by the eluted element in the ink. Moreover, when a material to which, as an additive, butyl stearate that is an ester type additive is added comes in contact with the water-resistant ink, butyl stearate is eluted into the ink and the eluted butyl stearate is hydrolyzed in the alkaline ink. Thus, stearic acid is produced and then hydrogen ions are generated. It seems, then, that the generated hydrogen ions are absorbed by an amino group of a silane compound. Therefore, it is assumed that when the hydrogen ion concentration is over a certain level, the interaction of the amino group of the silane compound and an anion group of a dye is strengthened and thus the bonding between the silane compound and the dye is also strengthened and becomes cohesive, resulting in gelling the ink.

As shown in Tables 1 and 2, neither the water-resistant ink A nor B was gelled in any one of Comparative Examples 9 through 14 in which samples were formed by adding two additives to ethylene propylene rubber. That is to say, although it is preferable that no additive is contained in a material, a water-resistant ink will not be gelled, whatever additives are, as long as the total amount of the additives contained in the material is 0.1% by mass or less.

As shown in Table 1, neither the water-resistant ink A nor B was gelled in Examples 7 and 8 in which no additive was added to ethylene propylene rubber.

In contrast, as shown in Table 5, the water-resistant ink A was gelled in Comparative Examples 15 through 17 in which ethylene propylene rubber contains two additives in the total amount of 0.2% by mass. It was also gelled in Comparative examples 13 and 14 in which ethylene propylene rubber contains three additives in an total amount of 0.3% by mass or more. That is to say, assume that two or more additives are added to a material. If the total of the contents of the additives is 0.1% by mass or less, a water-resistant ink will not be gelled. If the total of the contents of the additives is 0.2% by mass or more, the water-resistant ink will be gelled.

Meanwhile, as shown in Tables 2 and 3, in the case where two or more additives were added to butyl rubber (Examples 15 through 20), nitrile rubber (Examples 21 through 23), polystyrene (Examples 24 through 26), or polyurethane (Examples 27 through 29), the same results were also obtained as those of the cases where additives were added to ethylene propylene rubber. Specifically, when the total of contents of the additives was controlled to be 0.1% by mass or less, neither the water-resistant ink A nor B was gelled. As shown in Table 5 and 6, when the total of contents of the additives was 0.3% by mass (Comparison Examples 18 through 25), both of the water-resistant inks A and B were gelled. That is to say, whatever material is used, a water-resistant ink will not be gelled if the total of contents of the additives is 0.1% by mass or less. But, the ink will be gelled if the total of contents of the additives is 0.2% by mass or more.

In Comparative Examples 26 through 28 in which stearyl alcohol was added as an additive to ethylene propylene rubber, even when the content of the additive was 0.5% by mass or more, neither the water-resistant ink A nor B was gelled. That is to say, in the case of an alcohol type additive, hydrogen ions are not generated and therefore ink is not gelled.

INDUSTRIAL APPLICABILITY

In the present invention, the content of an additive in a material for each of members of an ink jet recording head, an ink cartridge or a recording apparatus is set to be a specific level, and thereby property changes of ink can be prevented. Therefore, reduction in the lifetime of the ink can be suppressed. In this point, the present invention has high industrial applicability.

What is claimed is:

1. An ink jet recording head with which ink for ink jet recording including a color, a humectant, a penetrant, water, and a water-soluble substance which undergoes condensation polymerization without the water is used, characterized in that
   a material containing a hydrogen ion releasing additive is used for at least part of the ink jet head with which the ink for ink jet recording comes in contact, and
   solubility of the water-soluble substance is maintained even when an element of the material containing the additive is eluted into the ink for ink jet recording, without condensing the color and the water-soluble substance by catalysis of the hydrogen ion due to a low concentration of hydrogen ion generated by the eluted element.

2. An ink jet recording head with which ink for ink jet recording including a color, a humectant, a penetrant, water, and a water-soluble substance which undergoes condensation polymerization without the water is used, characterized in that
   a material containing a hydrogen ion releasing additive is used for at least part of the ink jet head with which the ink for ink jet recording comes in contact,
   the content of the additive in the material is controlled to be 0.1% by mass or less, and
   solubility of the water-soluble substance is maintained even when an element fo the material containing the additive is eluted into the ink for ink jet recording without condensing the color and the water-soluble substance by catalysis of the hydrogen ion due to a low concentration of hydrogen ion generated by the eluted element.

3. The ink jet recording head of claim 2, characterized in that the content of the additive in the material is 0.001% by mass or more.

4. The ink jet recording head of either one of claims 1 and 2, characterized in that the material containing the hydrogen ion releasing additive is resin or rubber.

5. The ink jet recording head of either one of claims 1 and 2, characterized in that the water-soluble substance is a hydrolyzable silane compound.

6. The ink jet recording head of either one of claims 1 and 2, characterized in that
   the color is a dye including an anion group, and
   the water-soluble substance is a hydrolyzable silane compound including an amino group.

7. The ink jet recording head of either one of claims 1 and 2, characterized in that the additive includes at least one of an acid, a ketone, and a functional group of ester each of which exhibits acidic properties.

8. An ink cartridge with which ink for ink jet recording including a color, a humectant, a penetrant, water, and a water-soluble substance which undergoes condensation polymerization without the water is used, characterized in that
   a material containing a hydrogen ion releasing additive is used for at least part of the ink cartridge with which the ink for ink jet recording comes in contact, and
   solubility of the water-soluble substance is maintained even when an element of the material containing the additive is eluted into the ink for ink jet recording, without condensing the color and the water-soluble substance by catalysis of the hydrogen ion due to a low concentration of hydrogen ion generated by the eluted element.

9. An ink cartridge with which ink for ink jet recording including a color, a humectant, a penetrant, water, and a water-soluble substance which undergoes condensation polymerization without the water is used, characterized in that
   a material containing a hydrogen ion releasing additive is used for at least part of the ink cartridge with which the ink for ink jet recording comes in contact, and
   the content of the additive in the material is controlled to be 0.1% by mass or less, and
   solubility of the water-soluble substance is maintained even when an element of the material containing the additive is eluted into the ink for inkjet recording, without condensing the color and the water-soluble substance by catalysis of the hydrogen ion due to a low concentration of hydrogen ion generated by the eluted element.

10. The ink cartridge of claim 9, characterized in that the content of the additive in the material is 0.001% by mass or more.

11. The ink cartridge of either one of claims 8 and 9, characterized in that the material containing the hydrogen ion releasing additive is resin or rubber.

12. The ink cartridge of claim of either one of claims 8 and 9, characterized in that the water-soluble substance is a hydrolyzable silane compound.

13. The ink cartridge of either one of claims 8 and 9, characterized in that
   the color is a dye including an anion group, and
   the water-soluble substance is a hydrolyzable silane compound including an amino group.

14. The ink cartridge of claim of either one of claims 8 and 9, characterized in that the additive includes at least one of an acid, a ketone, and a functional group of ester each of which exhibits acidic properties.

15. A recording apparatus with which ink for ink jet recording including a color, a humectant, a penetrant, water, and a water-soluble substance which undergoes condensation polymerization without the water is used, characterized in that
   a material containing a hydrogen ion releasing additive is used for at least part of the recording apparatus with which the ink for ink jet recording comes in contact, and
   solubility of the water-soluble substance is maintained even when an element of the material containing the additive is eluted into the ink for ink jet recording, without condensing the color and the water-soluble substance by catalysis of the hydrogen ion due to a low concentration of hydrogen ion generated by the eluted element.

16. A recording apparatus with which ink for ink jet recording including a color, a humectant, a penetrant, water, and a water-soluble substance which undergoes condensation polymerization without the water is used, characterized in that a material containing a hydrogen ion releasing additive is used for at least part of the recording apparatus with which the ink for ink jet recording comes in contact, and the content of the additive in the material is controlled to be 0.1% by mass or less, and solubility of the water-soluble substance is maintained even when an element of the material containing the additive is eluted into the ink for ink jet recording, without condensing the color and the water-soluble substance by catalysis of the hydrogen ion due to a low concentration of hydrogen ion generated by the eluted element.

17. The recording apparatus of claim 16, characterized in that the content of the additive in the material is 0.001% by mass or more.

18. The recording apparatus of either one of claims 15 and 16, characterized in that the material containing the hydrogen ion releasing additive is resin or rubber.

19. The recording apparatus of either one of claims 15 and 16, characterized in that the water-soluble substance is a hydrolyzable silane compound.

20. The recording apparatus of either one of claims 15 and 16, characterized in that the color is a dye including an anion group, and the water-soluble substance is a hydrolyzable silane compound including an amino group.

21. The recording apparatus of either one of claims 15 and 16, characterized in that the additive includes at least one of an acid, a ketone, and a functional group of ester each of which exhibits acidic properties.

\* \* \* \* \*

UNITED STATES PATENT AND TRADEMARK OFFICE
CERTIFICATE OF CORRECTION

PATENT NO. : 6,955,429 B2 Page 1 of 1
APPLICATION NO. : 10/468955
DATED : October 18, 2005
INVENTOR(S) : Mamoru Soga et al.

It is certified that error appears in the above-identified patent and that said Letters Patent is hereby corrected as shown below:

<u>Title page,</u>

Item (73) Assignee: "Matsushtia" should be --Matsushita--.

Signed and Sealed this

First Day of August, 2006

JON W. DUDAS
*Director of the United States Patent and Trademark Office*